(12) United States Patent
Hagedorn

(10) Patent No.: US 8,100,355 B2
(45) Date of Patent: Jan. 24, 2012

(54) DEVICE FOR TRANSPORTING AND PROCESSING FOODSTUFFS

(75) Inventor: Jan-Nils Hagedorn, Ottersberg (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 302 days.

(21) Appl. No.: 12/400,066

(22) Filed: Mar. 9, 2009

(65) Prior Publication Data
US 2009/0224085 A1    Sep. 10, 2009

(30) Foreign Application Priority Data
Mar. 10, 2008  (DE) .......................... 10 2008 013 393

(51) Int. Cl.
*B02C 18/34* (2006.01)
(52) U.S. Cl. ................. 241/82.5; 15/104.001; 241/285.2
(58) Field of Classification Search ........ 241/82.1–82.7, 241/166, 285.1–285.3; 15/104.001
See application file for complete search history.

(56) References Cited

U.S. PATENT DOCUMENTS

| | | | | |
|---|---|---|---|---|
| 2,539,448 | A | * | 1/1951 | Lundell ...................... 241/285.1 |
| 3,125,144 | A | * | 3/1964 | Lundell ........................ 241/82.5 |
| 3,414,925 | A | | 12/1968 | Stavros |

FOREIGN PATENT DOCUMENTS

| | | |
|---|---|---|
| DE | 811793 | 8/1951 |
| DE | 2044228 | 3/1972 |
| DE | 108214 A1 | 12/1973 |
| DE | 19942311 A1 | 3/2001 |
| EP | 1837078 A1 | 9/2007 |
| WO | 2005110099 A1 | 11/2005 |

OTHER PUBLICATIONS

German Patent Office, Search Report in DE 102008013393.0-23, Jan. 12, 2009.
European Patent Office, Extended European Search Report in EP Application No. 09154646, Jun. 2, 2009.

* cited by examiner

*Primary Examiner* — Mark Rosenbaum
(74) *Attorney, Agent, or Firm* — Wood, Herron & Evans, L.L.P.

(57) ABSTRACT

A device for transporting and processing foodstuffs, in particular meat, includes a feeding device, a grinder with an input and an outlet, and a drive element to drive cutting elements situated in a housing of the grinder. The cutting elements are situated in the housing of the grinder in such a way that the cutting elements can be removed from the housing of the grinder through the outlet by means of a force applied to the side of the input.

11 Claims, 3 Drawing Sheets

DEVICE FOR TRANSPORTING AND PROCESSING FOODSTUFFS

BACKGROUND

The present invention is directed to a device for transporting and processing foodstuffs, and more specifically, meat products.

To produce foodstuffs, in particular meat of fine consistency, it is normally necessary to mix various starting materials or ingredients and process them together. For example, a device adapted to produce these foodstuffs can include a feeding device, a grinder with an input and an outlet, and a drive element to drive cutting elements situated in a housing of the grinder. In such devices, the various starting materials, such as meats and/or doughs as well as plant ingredients, known in German as Braet (raw sausage) in the case of meat, are introduced into a feed hopper and an associated feeding device, the combination also known as a stuffing machine. Within this feeding device, the individual ingredients are thoroughly mixed, and a transport device such as a worm drive transports the mixed ingredients to a grinder attached to the device. Depending on the consistency of the starting materials or ingredients and the steps used to process the foodstuffs, the grinder may include a stuffing grinder, separating grinder, or chopper. A grinder of this sort contains cutting elements that cut up or mince the mixed material and force it out through an orifice situated at the outlet of the grinder. The orifice at the outlet is bounded by a so-called perforated disk. The cutting elements are driven in a known manner by a drive element, which transmits a torque to the cutting elements, for example by means of a driveshaft. This driving torque causes the cutting elements to rotate, which brings about the mincing process.

In particular when processing meat, particles of various sizes collect in the interior of the grinder, usually in the area of the cutting elements. These particles can consist, for example, of fat, meat, cartilage or bone. To maintain a constant output of minced material and to prevent damage to the apparatus, it is necessary to remove these particles from the interior of the grinder. In the known devices for transporting and processing foodstuffs, the grinder is firmly connected to the device. In order to clean the area in which the cutting elements are situated, an operator removes the perforated disk situated at the outlet of the grinder and withdraws the cutting elements from the grinder with a pulling tool. These pulling tools have proven to be difficult to handle in practice.

A major problem of the known device is that regardless of possible safety precautions for servicing the device when the grinder is open, the device may be set in motion while the operator is disassembling the cutting elements. It is obvious that this carries a significant risk of injury and can even result in the loss of limbs.

Consequently, one object of the present invention was to specify a device that reduces as much as possible the risk of injury while servicing the grinder.

SUMMARY OF THE INVENTION

The present invention solves the forenamed problem with a device of the type named at the beginning, by means of cutting elements that are completely uncouplable from the drive element driving means, and by having the cutting elements situated in the housing of the grinder in such a way that they are removable from the housing of the grinder through the outlet by means of a force applicable to the input side.

Such an arrangement of the cutting elements brings the advantage that when the grinder is disassembled from the device the cutting elements are separated automatically from the drive element. This type of complete decoupling ability means that no additional steps need to be undertaken by the operator to ensure the safety of the operator when the cutting elements of the grinder are removed for cleaning purposes. It is also an advantage for such a design of the device if the cutting elements can be attached to the drive element, which is designed as a driveshaft. This makes it possible to press the cutting elements out of communication with the driveshaft at any time by disassembling the grinder from the device. The combination of these advantages achieves a high degree of safety without risk of injury, and simple disassembly and cleaning.

In another embodiment of the device according to the invention, the cutting elements can be pressed out of the housing by means of a pressure extracting tool that is insertable into the interior of the grinder on the input side. This exhibits another advantage of the invention, which is that it is possible to press the cutting elements out of the grinder housing, instead of having to pull them out, as in the past. A pressure extraction tool should advantageously be designed so that the cutting elements can be pressed out to the output side by inserting the pressure extraction tool into the interior of the grinder on the opposite side in the area of the input.

According to a refinement of the forenamed embodiment, one or more perforated disks are positioned in the grinder in such a way that they are removable from the housing of the grinder on the output side by the pressure extraction tool together with the cutting elements. Like the cutting elements, the perforated disks need to be removed from the housing for cleaning the grinder. For this reason, it appears advantageous to remove them from the housing of the grinder with the pressure extraction tool in one operation, together with the cutting elements. This arrangement of elements reduces the time expenditure for cleaning or servicing the grinder.

In another preferred embodiment, the housing of the grinder has an essentially centrally situated opening on the input side to receive the pressure extraction tool. The side which has the opening to receive the pressure extraction tool must be chosen so that it is located opposite the side on which the cutting elements, and possibly the perforated disks, are to be pressed out of the grinder housing. Although the central position of the opening is seen as advantageous with regard to uniform distribution of force through the pressure extraction tool, other arrangements of the opening are also conceivable. This depends primarily on the design of the pressure extraction tool. For example, it can also be advantageous to design the pressure extraction tool so that one or more sections are inserted into the interior of the grinder at various places at the same time, so as to act on these for example at the edge of the cutting elements or perforated disks. Such an arrangement and design of the pressure extraction tool prevents the parts that are being pressed out from tilting.

In a refinement of the invention, the device has supporting elements which are designed to support the grinder during installation. The term installation is used to mean both attaching the grinder to and detaching it from the device. The supporting elements support the grinder, so that it can be released from the device without tilting or becoming detached from the device in such a way that attaching it back onto the device is not possible without elaborate aligning measures. That makes it possible to detach the grinder from the device safely prior to a cleaning procedure, and to separate it from the drive element. In a state in which the grinder is no longer connected to the drive element of the device, it is no longer possible to set the cutting elements in motion by switching the device on unintentionally. At the same time, the supporting elements ensure that the grinder can be connected to the device again without problem after the cleaning procedure is ended. The supporting elements thus support the grinder in at least one connected position, as well as in a position in which the grinder is situated at a distance from the device and in particular from the drive element.

Furthermore, the supporting elements are designed to support the grinder at least partially during a motion coaxial to an axis of the drive element. The possibility of detaching the grinder from the device coaxially to the drive element is especially advantageous. The driving element employed is a shaft, which may be brought into engagement with a corresponding hub element of the cutting elements. The operator is thus able to withdraw the cutting elements from the drive shaft axially, and likewise to connect them to the shaft again by an axial motion after the grinder has been cleaned. The coaxial arrangement of the grinder in relation to the drive element make it possible to minimize the effort of calibration and alignment. The supporting elements are connected to the grinder and to the device. This arrangement provides for very high precision of repetition in the movement of the grinder relative to the device. Because the supporting elements all have clearly defined reference points in reference to the device and the grinder due to the connection, the grinder can be positioned on the device reliably and precisely even when being attached and detached repeatedly, and no additional supporting devices are needed.

According to a refinement of the present invention, the supporting elements are designed as multisectional hinges. A hinge which has in particular two or more hinge links makes it possible by means of a simple design to move the grinder in a straight line, at least for a certain distance. This is particularly advantageous when a coaxial movement between two elements is to be achieved, as in the present arrangement. Furthermore, a multisectional hinge also fulfills the demands for precision of positioning in connection with large movable parts (grinders with a diameter of more than 100 mm). The multisectional hinge is designed so that the grinder is movable essentially coaxially to the axis of the drive element in a first range, and in a second range can be swiveled in a lateral direction. Such a design of the multisectional hinge is particularly advantageous because the grinder can first be removed from the device by the operator coaxially to the driveshaft, and then can be swiveled to a side, which simplifies access to the interior of the grinder.

According to another embodiment of the invention, the supporting elements are designed as a linear guide. Designing the supporting elements as a linear-guided system enables the directional accuracy in the direction of the longitudinal axis of the drive shaft to be further increased. This arrangement can be advantageous if the design makes especially precise guidance of the grinder desirable or necessary.

Preferably, at the outlet of the grinder there is a perforated disk which is closed at its center. This design of a closed perforated disk has proven to be especially advantageous in operation. Because of the complete coverage of the end of the drive element, viewed from the end of the outlet, it is impossible to pull the perforated disk and possibly the cutting elements behind it out of the housing of the grinder without first uncoupling the grinder from the device mechanically. When a closed perforated disk is used, it is thus no longer possible to circumvent this safety provision. In addition, it has been found that the output of material from the grinder in operation can be improved if a closed perforated disk is placed in the grinder on the output side.

In another preferred embodiment of the present invention the grinder has handles which are designed to move the grinder relative to the device. It has proven to be advantageous to provide handles on the outer surface area of the grinder housing, which the operator can use to pull the grinder off of the device coaxially to the drive element in a manually guided motion. Swiveling the grinder from the coaxial motion into a swiveling motion toward one side is also easily done with gripping handles.

In another advantageous embodiment of the invention, arresting means are designed so that they join the housing of the grinder detachably to the connection of the device. Such arresting means can be formed for example by a bayonet lock. The arresting means are operated after the grinder has been connected to the device, in order to clamp it immovably to the device. Using the example of a bayonet lock, corresponding protrusions and recesses on the grinder and the arresting means mesh with each other and are secured to each other by a rotational motion of the arresting means. Numerous other arresting options are also conceivable, however. Care must always be taken, however, to ensure that the axial position of the grinder in relation to the device, and particularly in relation to the drive element, is not changed by operating the arresting means.

The invention further solves the problem by a method for cleaning uninstalling a grinder from a device for transporting and processing foodstuffs. The process comprises these steps: uncoupling the grinder from the drive element, and pressing cutting elements out of the housing of the grinder on the side of an outlet. The method according to the invention offers itself as a means of servicing the grinder and the device without risk. To this end, the grinder is first completely uncoupled mechanically from the drive element, for example by releasing the arresting system; only then can the cutting elements be pressed out of the housing of the grinder from the side of the input in the direction of the outlet. When this procedure is used, there is no possibility of the drive element unintentionally setting the cutting elements in motion while the cutting elements are being worked on, a possibility that repeatedly has led to severe injuries in the past with known devices and procedures.

According to a refinement of the method according to the invention, the process of uncoupling the grinder is carried out in the steps: pulling the grinder off of the device axially, and swiveling the grinder at least partially toward one side. Pulling the grinder off axially causes the cutting elements to be pulled off of the drive element, which may be designed for example as a driveshaft with a corresponding shaft end. This requires a straight-line or free-hand movement of the grinder. After the grinder has been pulled off of the drive element, it is also necessary and desirable to simplify access to the input side of the housing of the grinder. To this end, it is advantageous to be able to swivel the grinder toward one side. After the swiveling of the grinder has been performed, an operator has sufficient space and handling options to press the cutting elements out of the outlet of the grinder.

In a refinement of the method according to the invention, pressing the cutting elements out of the housing of the grinder is accomplished by inserting a pressure extraction tool and applying a pressure force to the cutting elements with the pressure extraction tool in the direction of the outlet in the housing, and pressing the cutting elements out of the grinder. It can be necessary or advantageous to support the insertion of the pressure extraction tool with additional means of guidance in order to prevent tilting or faulty insertion of the pressure extraction tool. It also appears conceivable to support the operator's manual force by adding, hydraulic or pneumatic tools to press.

According to another embodiment of the method according to the invention, one or more perforated disks are pressed out of the grinder together with the cutting elements. In this way, the entire mechanical inner workings of the grinder can be removed from the latter's housing in a single operation in order to service and clean it.

According to another aspect of the present invention, a pressure extraction tool is provided, in particular for use with the device for transporting and processing foodstuffs. The pressure extraction tool is designed to have at least one section inserted into the interior of a grinder, and has a contact surface which can be brought into contact with cutting elements and one or more perforated disks of a grinder in a frictional or positive lock.

The pressure extraction tool is advantageously designed so that the section which is to be inserted into the interior of the housing of the grinder has a cross section that corresponds to the cross section of an opening in the housing of the grinder. To prevent the pressure extraction tool from tilting, it can also be advantageous to provide guide sections, which guide the section that is to be inserted into the grinder. These guide sections could be provided for example by the wall surfaces of the corresponding opening in the housing of the grinder. The contact surface of the pressure extraction tool is designed so that the pressure extraction tool cannot slide off of the cutting elements or perforated disks after the pressure extraction tool has been inserted into the interior of the housing of the grinder. This is ensured by a friction-lock or positive-lock contact produced between the cutting elements and perforated disks and the contact surface of the pressure extraction tool. Depending on the design of the cutting elements and their coordination with the housing of the grinder, it can be desirable to rotate the cutting elements and perforated disks when forcing them out of the grinder. To this end, it is advantageous if the contact surface can be brought into positive-locked contact with parts that are to be forced out. The positive lock can be ensured by corresponding projections and recesses.

In a refinement of the pressure extraction tool according to the invention, a crank can be provided by means of which the expelling force may be applied to the cutting elements.

The pressure extraction tool is advantageously designed to include a threaded rod which interacts with threading on the pressure extraction tool and may be used to convert a rotary motion, which is preferably applied by the crank or by a motor, into an axial advancing motion and force, by which the cutting elements can be pressed out through the outlet of the grinder.

BRIEF DESCRIPTION OF THE DRAWINGS

The invention will now be described in closer detail on the basis of exemplary embodiments, with reference to the accompanying figures. The figures show the following.

DETAILED DESCRIPTION

Figure 1:
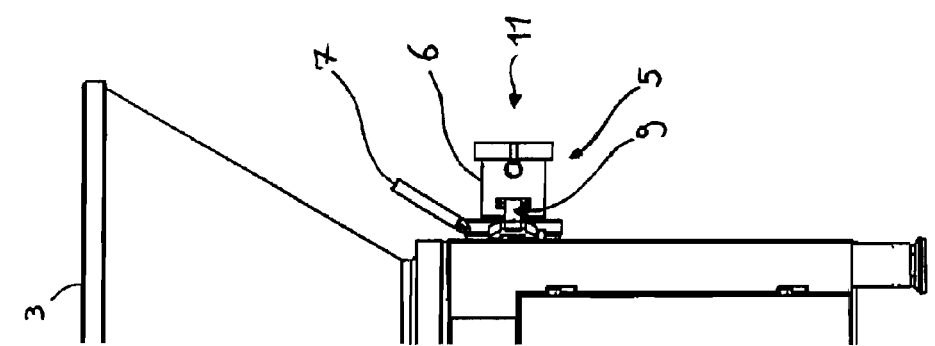
FIG. 1 is a side view of one embodiment of a device for trans-porting and processing foodstuffs.

FIG. 1 depicts part of a preferred exemplary embodiment of a device 1 for transporting and processing foodstuffs according to the invention. The device 1 includes a feeding device 3, designed as a feed hopper 3 and placed on top of the device 1. Feeding device 3 is designed to receive foodstuffs, in particular meat and other ingredients intended for processing, and to mix them with each other along a conveyor system (not shown) which is preferably motor-driven. In addition, the conveyor system is designed to convey the mixed ingredients to a grinder 5, which is coupled to the side of device 1 as shown in FIG. 1. The grinder 5 is attached to device 1 by an arresting system 7, shown in FIG. 1 as a bayonet lock. In addition, grinder 5 is connected to the device 1 by supporting elements 9, which are designed as double hinges in this exemplary embodiment. Grinder 5 includes a housing 6, which is designed to receive cutting elements 31 and at least one perforated disk 33 (described in detail with respect to FIGS. 6 and 7, below). The grinder 5 further includes an outlet 11, through which the ingredients minced by the cutting elements 31 are dispensed from device 1.

Figure 2:
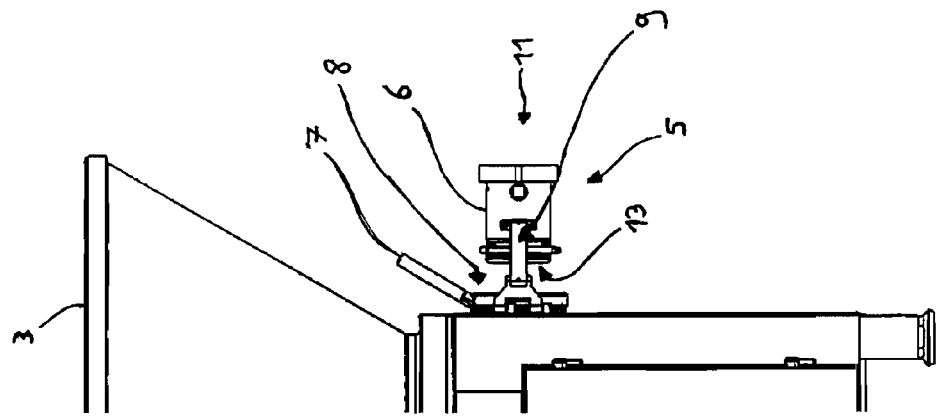
FIG. 2 is a side view of the device of FIG. 1, wherein the grinder is disengaged from the drive element.

FIG. 2 illustrates the device 1 of FIG. 1, where the grinder 5 has been moved away from the device 1 so as to disengage the grinder 5 from a drive element 15. FIG. 2 depicts an alternative operating state of the device from FIG. 1, wherein grinder 5 is in a position separate from device 1. FIG. 2 further illustrates that grinder 5 has, in addition to outlet 11, an input 13 which faces a connection 8 in device 1 in the orientation of the grinder 5 and the device 1 shown in FIG. 2. The supporting elements 9 are designed to support and guide grinder 5 as the grinder 5 moves with respect to the device 1, and to hold the grinder 5 in a position which is selected by the operator.

To bring the grinder 5 from the state shown in FIG. 1 to the state shown in FIG. 2, it is necessary to release arresting system 7 and to pull the grinder 5, in particular its input 13, away from the connection 8 of device 1. The grinder is initially pulled off of device 1 coaxially to an axis of the drive element, which can be seen from the following FIGS. 3 through 7. After the grinder 5 has been released, it is slid off the drive element 15 in an axial direction shown by axis 17 in such a way that the cutting elements 31 of the grinder 5 are completely uncoupled from the drive element 15. After the uncoupling is complete, the cutting elements 31 can be pressed out through the outlet 11 of the grinder 5 as described below, after the grinder 5 has been moved away from feeding device 3 far enough so that a pressure can be applied to the side of the input 13 to press the cutting elements 31 out.

Figure 3:
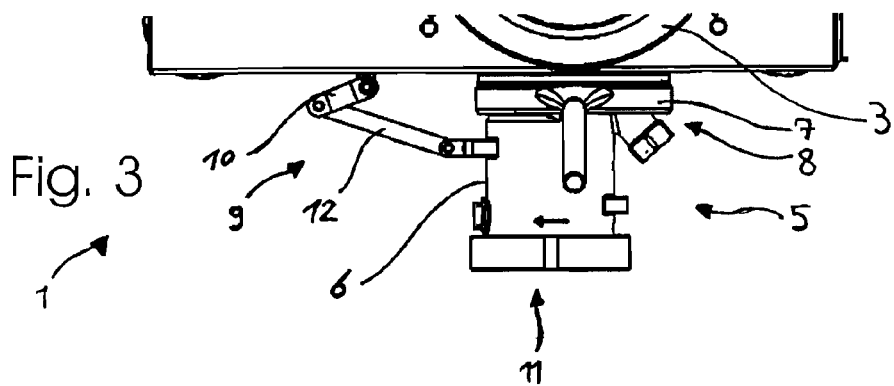
FIG. 3 is a top view of the device of FIG. 1.
Figure 4:
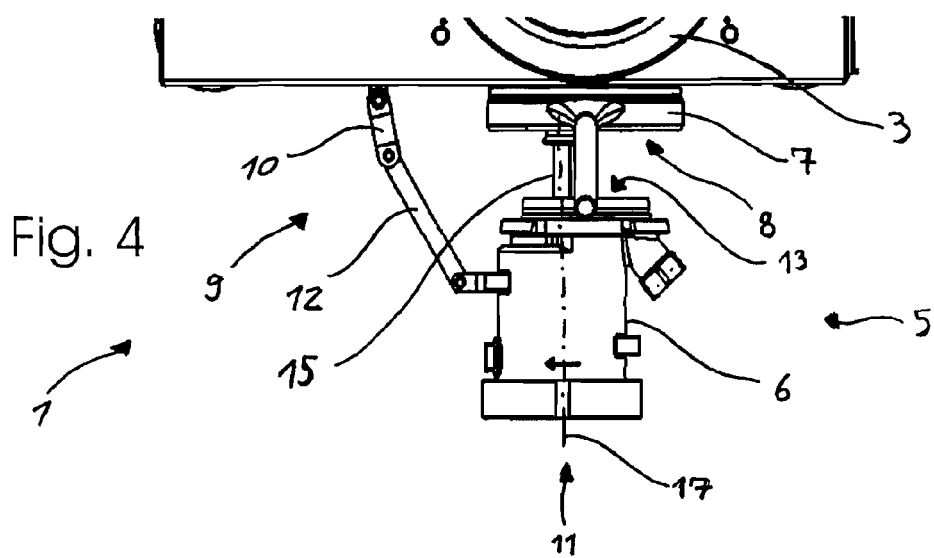
FIG. 4 is a top view of the device of FIG. 1, wherein the grinder is disengaged from the drive element.
Figure 5:
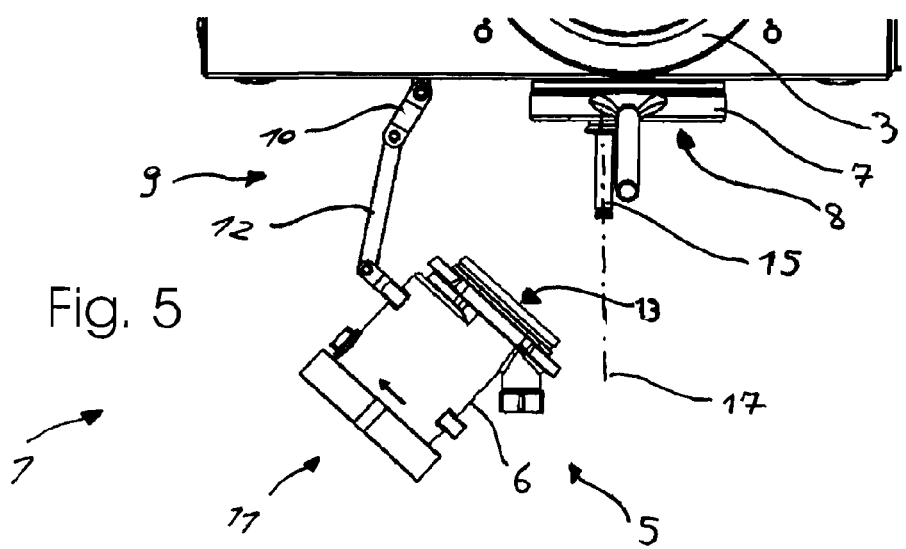
FIG. 5 is a top view of the device of FIG. 1, wherein the grinder is pivoted away from the drive element.

FIGS. 3 through 5 depict various operating states of the device 1 according to the invention. FIGS. 3-5 correspond to a view from above. Feeding device 3, designed as a hopper, is partially shown. It can also be seen that grinder 5 is connected to device 1 by means of supporting elements 9, which are designed as double hinges. In the exemplary embodiment depicted, the supporting elements 9 include a first hinge link 10 and a second hinge link 12. Hinge link 10 is pivotally connected with device 1 on one end, and is pivotally connected with second hinge link 12 on an opposite end. In addition, second hinge link 12 is pivotally connected with the housing 6 of the grinder 5. The outlet 11 of grinder 5 is oriented parallel to the connection 8 of device 1 when the grinder 5 is coupled to the device 1, as shown in FIG. 3. In that operating state, the input 13 of the grinder 5 is engaged in contact with the connection 8 of device 1. Grinder 5 is also attached to device 1 by arresting means 7.

FIG. 4 depicts grinder 5 in a state separate from device 1. Connector 8 of device 1 is not connected to the input 13 in the depicted position. The arresting means 7 are released. Supporting elements 9, designed as double hinges, are essentially extended compared to their position in FIG. 3. This extended position of supporting elements 9 results from the position of grinder 5 at a distance from device 1.

Grinder 5 has been brought from the operating state of FIG. 3 to the operating state of FIG. 4 by a movement that guides the grinder essentially along longitudinal axis 17. Longitudinal axis 17 is essentially coaxial to drive element 15, which is a driveshaft in the chosen embodiment. The extension of hinge links 10, 12 automatically occurs with the coaxial movement of grinder 5 along longitudinal axis 17 of the drive element 15. In this position, grinder 5 is held in its position at a distance from the device by supporting elements 9. After grinder 5 has been pulled off of device 1 along axis 17, it is possible to move grinder 5 still further.

A possible further state of motion is depicted below in FIG. 5. Grinder 5 is brought from the operating state of FIG. 4 into the operating state of FIG. 5 by swiveling to one side. This swiveling motion is supported by supporting elements 9, in that first hinge link 10 and second hinge link 12 of supporting elements 9, as well as grinder 5, execute a planar motion, which corresponds in the chosen embodiment to a three-fold pendulum. Thus first hinge link 10, second hinge link 12 and grinder 5 are designed to be moved independently of each other. In the operating state shown in FIG. 5, the grinder is no longer in an orientation coaxial to longitudinal axis 17 of drive element 15.

It is evident from these FIGS. 3 through 5 that after the coaxial removal procedure has been completed, the grinder 5 can be moved to any position and orientation desired, in order to give the operator optimal access to the interior of the housing of grinder 5, including the cutting elements 31 and the perforated disc 33. Depending on the design of grinder 5, access to grinder 5 is thus possible both from the side of input 13 and from the side of outlet 11.

Figure 6:
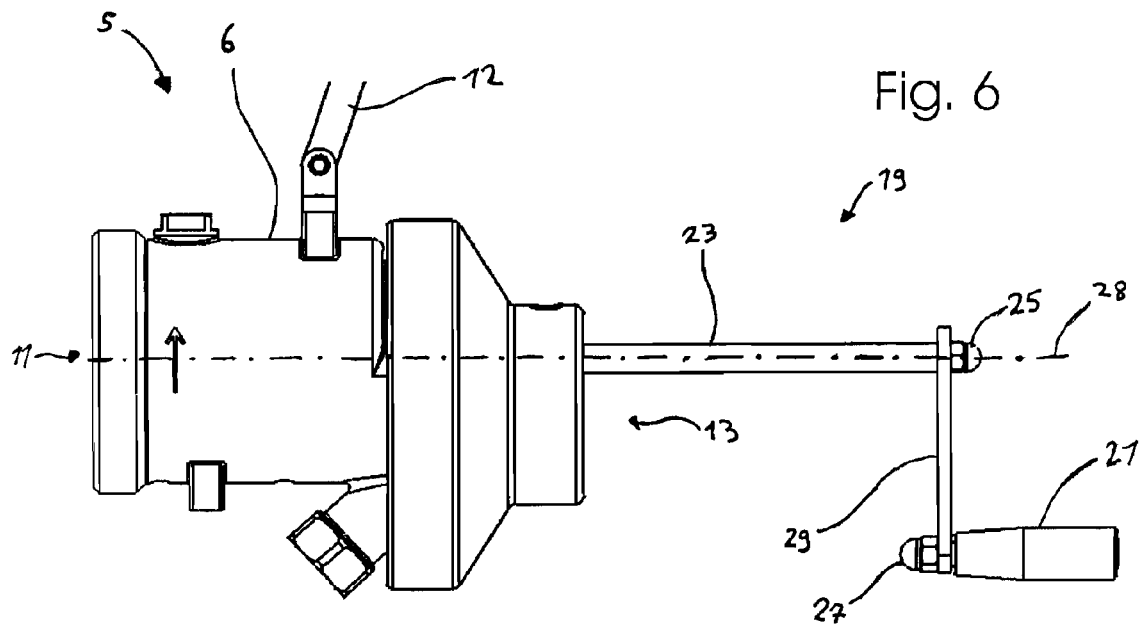
FIG. 6 is a top view of the device of FIG. 1 with a pressure extraction tool coupled to the grinder inlet.
Figure 7:
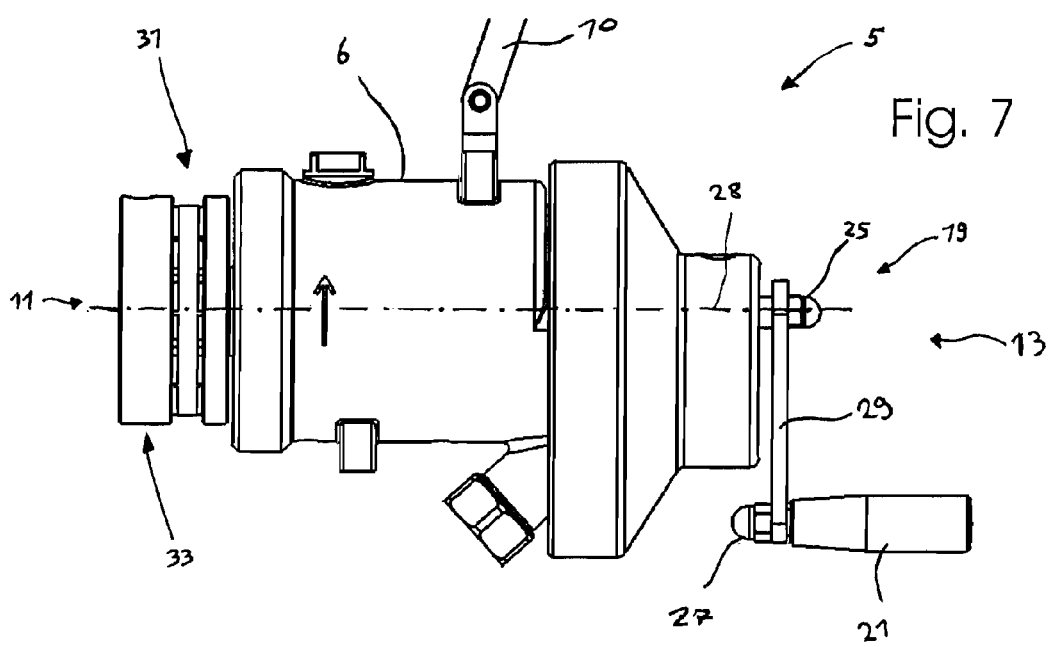
FIG. 7 is a top view of the device and pressure extraction tool of FIG. 6, wherein the pressure extraction tool has pushed the cutting elements beyond the grinder outlet.

A pressure extraction tool 19 according to the present invention is illustrated in FIGS. 6 and 7. FIG. 6 illustrates the grinder 5 is a position away from the device 1 as shown in FIG. 5 above. The housing 6 of the grinder 5 receives cutting elements 31 and perforated disk 33. This is recognizable in particular in FIG. 7. The cutting elements 31 and the perforated disk 33 are situated essentially centrally in the housing 6 of grinder 5, and are rotatably mounted around an axis of rotation 28. In FIGS. 6 and 7, the pressure extraction tool 19 also extends along axis of rotation 28 at least part way into the interior of housing 6 of grinder 5. Pressure extraction tool 19 has a guide section 23, shown in the present exemplary embodiment as a rod with cylindrical cross section, partially provided with external threads (not shown). Guide section 23 is coupled to an arm 29 by fastening elements 25. For example, the fastening elements 25 are designed as threaded connectors in the present exemplary embodiment. Arm 29 is coupled to a crank 21 with fastening elements 27. Fastening elements 27, like fastening elements 25 in the present exemplary embodiment, are threaded connectors. It can be advantageous to attach crank 21 to arm 29 so that it can rotate. In FIGS. 6 and 7, pressure extraction tool 19 is inserted into housing 6 of grinder 5 with guide section 23 on the side of the input 13 of grinder 5. In FIG. 6, guide section 23 of pressure extraction tool 19 is situated essentially outside of housing 6 of grinder 5, and cutting elements 31 and perforated disk 33 are situated essentially in the interior of housing 6 of grinder 5. In FIG. 7, guide section 23 of pressure extraction tool 19 is situated essentially inside of grinder 5, and cutting elements 31 and perforated disk 33 are situated essentially outside of grinder 5 on the side of outlet 11.

As shown in FIG. 7, the cutting elements 31 and the perforated disk 33 are forced out of the grinder 5 by inserting pressure extraction tool 19 into the grinder 5. Next, by exerting a force in the direction of the grinder 5 on pressure extraction tool 19, in particular on crank 21 and crank arm 29, the inner workings of grinder 5, in particular the cutting elements 31 and the perforated disk 33, are pressed out of grinder 5 in the direction in which the force is exerted. In the exemplary embodiment in FIGS. 6 and 7 this corresponds to motion in the direction of the side of outlet 11 of grinder 5. It is also conceivable that the process of forcing out the cutting elements 31 and perforated disk 33 is produced and/or and supported by a rotational motion of pressure extraction tool 19 by means of crank 21.

In a preferred exemplary embodiment, the rotary motion applied by crank 21 is converted by means of the threaded rod, which interacts with threading of pressure extraction tool 19, into an axial advancing motion and force, by which the cutting elements are pressed out through the outlet 11 of the grinder. The rotary motion of the crank 21 can be applied mechanically by means of a drive motor instead of manually, for example by means of an electric motor or the like.

What is claimed is:

1. A device for transporting and processing foodstuffs, comprising:
    a feeding device;
    a grinder including a housing with an input and an outlet, the housing containing cutting elements adapted to mince the foodstuffs;
    a drive element adapted to drive the cutting elements; and
    supporting elements coupled to the housing of the grinder and adapted to support the grinder as the grinder engages and disengages from the drive elements, the supporting elements including at least two hinge links which pivot to allow the grinder to move axially along the drive element and also allow swivel movement of the grinder when the grinder is disengaged from the drive element,
    wherein the cutting elements are mounted within the housing such that the cutting elements can be extended through the outlet by a force applied to an input-side of the housing.

2. The device of claim 1, further comprising:
    a pressure extraction tool including a guide section adapted to be extended into the housing to displace the cutting elements.

3. The device of claim 2, wherein the housing further comprises:
    an opening centrally located on the input side of the housing, the opening adapted to receive the guide section of the pressure extraction tool.

4. The device of claim 1, wherein the grinder further comprises:
    a perforated disc positioned within the housing and adjacent to the cutting elements, the perforated disc mounted such that the perforated disc can be extended through the outlet with the cutting elements.

5. The device of claim 1, wherein the supporting elements comprise a linear guide.

6. The device of claim 1, wherein the housing further comprises handles adapted to be used to move the grinder.

7. The device of claim 1, further comprising:
   a connection adapted to couple to the input of the housing; and
   an arresting element adapted to lock the input to the connection.

8. A method for servicing and cleaning a grinder on a device for transporting and processing foodstuffs, the grinder including a housing with an input and an outlet, cutting elements within the housing, and a drive element operatively coupling the device and the grinder, the method comprising:
   uncoupling the grinder from the drive element by sliding the grinder along the drive element away from the device and swiveling the grinder at least partially towards one side of the drive element; and
   pressing the cutting elements through the outlet of the housing with a force applied to an input-side of the grinder.

9. The method of claim 8, wherein pressing the cutting elements further comprises:
   inserting a pressure extraction tool into the grinder adjacent the input; and
   applying a pressure force to the cutting elements is the direction of the outlet of the housing with the pressure extraction tool.

10. The method of claim 8, wherein the device further comprises a perforated disc, and the method further comprises:
    pressing the perforated disc through the outlet of the housing.

11. The method of claim 8, further comprising:
    removing debris or food particles from the vicinity of the cutting elements.

* * * * *

UNITED STATES PATENT AND TRADEMARK OFFICE
CERTIFICATE OF CORRECTION

PATENT NO.        : 8,100,355 B2
APPLICATION NO.   : 12/400066
DATED             : January 24, 2012
INVENTOR(S)       : Jan-Nils Hagedorn It is certified that error appears in the above-identified patent and that said Letters Patent is hereby corrected as shown below:

Column 10

Claim 9, line 5, change "is" to --in--.

Signed and Sealed this
Twentieth Day of March, 2012

David J. Kappos
*Director of the United States Patent and Trademark Office*